US009604322B2

(12) United States Patent
Walters (10) Patent No.: US 9,604,322 B2
(45) Date of Patent: Mar. 28, 2017

(54) GAS TURBINE ROTOR ASSEMBLY AND BALANCING METHODS

(71) Applicant: Pratt & Whitney Canada Corp., Longueuil (CA)

(72) Inventor: Cameron Walters, Newmarket (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 432 days.

(21) Appl. No.: 14/102,544

(22) Filed: Dec. 11, 2013

(65) Prior Publication Data
US 2014/0173899 A1    Jun. 26, 2014

Related U.S. Application Data

(62) Division of application No. 12/005,397, filed on Dec. 27, 2007, now Pat. No. 8,631,575.

(51) Int. Cl.
*B21K 25/00* (2006.01)
*B23P 15/00* (2006.01)
*F01D 5/02* (2006.01)

(52) U.S. Cl.
CPC ........... *B23P 15/006* (2013.01); *F01D 5/027* (2013.01); *F05D 2230/60* (2013.01); *F05D 2230/64* (2013.01); *Y10T 29/49316* (2015.01); *Y10T 29/49321* (2015.01)

(58) Field of Classification Search
CPC .. F01D 5/027; F05D 2230/60; F05D 2230/64; B23P 15/006; Y10T 29/49321; Y10T 29/49316
See application file for complete search history.

(56) References Cited

U.S. PATENT DOCUMENTS

| 3,952,602 A | 4/1976 | Lyman et al. |
| 5,214,585 A | 5/1993 | Ehrich |
| 5,408,875 A | 4/1995 | Matsushita et al. |
| 5,502,650 A | 3/1996 | Naruse et al. |

(Continued)

FOREIGN PATENT DOCUMENTS

| EP | 0962660 | 12/1999 |
| FR | 2626370 | 7/1989 |

(Continued)

OTHER PUBLICATIONS

"A New Practical Modal Method for Rotor Balancing", Bingang Xu and Liangsheng Qu, Research Institute of Diagnostics and Cybernetics, School of Mechanical Engineering, Xi'an Jiaotong University, People's Republic of China.
Axiam Incorporated, Engine Vibration Management & Performance Solutions.
"Balance This" Case Histories from Difficult Balance Jobs, Troy D. Feese, P.E. and Philip E. Grazier, Engineering Dynamics Incorporated, San Antonio, Texas.

(Continued)

*Primary Examiner* — Ryan J Walters
(74) *Attorney, Agent, or Firm* — Norton Rose Fulbright Canada LLP (57) ABSTRACT

Method of assembling a rotor assembly of a gas turbine engine having a plurality of components. The method comprises in one aspect calculating the bending forces due to the mass distribution along the rotor. In another aspect, an optimization routine iterates different rotor arrangements, comparing the calculated bending moments to determine a set of component positions that minimizes the bending forces. In another aspect, mass corrections are optimized to balance the rotor assembly.

17 Claims, 9 Drawing Sheets

(56) References Cited

U.S. PATENT DOCUMENTS

| | | |
|---|---|---|
| 5,537,861 A | 7/1996 | Seitelman et al. |
| 5,627,762 A | 5/1997 | Cameron et al. |
| 5,724,271 A * | 3/1998 | Bankert .................. F16F 15/32 701/124 |
| 6,341,419 B1 | 1/2002 | Forrester et al. |
| 6,898,547 B1 | 5/2005 | DeBlois et al. |
| 7,085,665 B2 | 8/2006 | Park |
| 7,186,079 B2 | 3/2007 | Suciu et al. |
| 7,243,023 B2 | 7/2007 | Skilton |
| 7,539,594 B2 | 5/2009 | Lee et al. |
| 7,912,587 B2 | 3/2011 | Walters et al. |
| 2005/0234576 A1 | 10/2005 | Lee |
| 2006/0130488 A1 | 6/2006 | Suciu et al. |
| 2007/0014660 A1 | 1/2007 | Lee |
| 2009/0165273 A1 | 7/2009 | Calvert et al. |

FOREIGN PATENT DOCUMENTS

| | | |
|---|---|---|
| JP | 06273254 | 9/1994 |
| JP | 2007271524 | 10/2007 |
| WO | WO95/34871 | 12/1995 |
| WO | WO03/060453 | 7/2003 |

OTHER PUBLICATIONS

"Complex Modal Balancing of Flexible Rotors Including Residual Bow", Paper 87-1840, Joint Propulsion Conference, vol. 4, No. 3, May-Jun. 1988.

"Compressors: Selection and Sizing" Royce N. Brown.

"Machinery Vibration: Balancing", Victor Wowk, McGraw-Hill, Inc.

"A Modified Balancing Method for Flexible Rotors Based on Multi-Sensor Fusion", Liu Shi, Journal of Applied Sciences 5 (3): 465-469, 2005.

Precitech: FMS Form Measurement Systems: Defining Measurement in Ultra Precision.

"Review: Rotor Balancing" W.C. Folies, P.E. Allaire and E.J. Gunter, Schock and Vibration 5 (1998) 325-336.

"Rotor Balancing Without Trial Weights" A. El-Shafei, A.S. El-Kabbany, A.A. Younan, Transactions of the ASME, vol. 126, Jul. 2004.

"Steady Synchronous Response and Balancing of Rotor Systems with Residual Shaft Bow", Harold D. Nelson, International Journal of Rotating Machinery, 8(6): 431-438, 2002.

"Using Manufacturing Tolerances and Practices to Minimize Unbalance", David Bayley, Schenck Trebel.

European Search Report dated Mar. 28, 2012.

* cited by examiner

GAS TURBINE ROTOR ASSEMBLY AND BALANCING METHODS

RELATED APPLICATIONS

This application is a divisional of U.S. Pat. No. 8,631,575 filed on Dec. 27, 2007, the content of which is hereby incorporated by reference.

TECHNICAL FIELD

The invention relates generally to methods for assembling rotor components and in particular, high speed rotors such as those in gas turbine engines.

BACKGROUND OF THE ART

It is routine for gas turbine engines to have to pass stringent vibration acceptance tests following production. Rotor eccentricities are a main source of engine vibration, and eccentricities can be alleviated by rotor balancing. Balancing is the act of aligning the masses and rotational centers of the rotor assembly. Complicating matters greatly is the fact that gas turbine engine rotors typically comprise a plurality of rotors, such as multiple compressor or turbine stages, which are bolted or clamped together. The prior art approaches to rotor balancing have had reasonable success with simple rotors, but not as much with complicated rotors of the type found in gas turbine engines. So, while methods and apparatuses already exist for assisting in gas turbine rotor balancing, errors present in these approaches can tend to be magnified by the complicated rotor designs, and thus present a risk that an engine will not meet test requirements despite having been balanced according to prior art techniques. If an engine does not pass the vibration acceptance limit, it typically must be disassembled, re-balanced, and reassembled, which wastes time and resources. Accordingly, there is a need to provide improvements to rotor assembly.

SUMMARY

In one aspect, there is provided a method of assembling a rotor assembly of a gas turbine engine having a plurality of components mounted generally between axially spaced-apart bearings, the method comprising: for each rotor component, determining a mass and a location of a center of mass of each component with respect to an axis of rotation defined by said spaced-apart bearings; using the mass and the location of the center of mass of each component to calculate reaction forces at the bearings; calculating the bending moments across the rotor representative of the forces reacted by the bearings when the rotor assembly rotates; optimizing an arrangement of rotor components to thereby minimize the bending moments of the rotor assembly; and assembling the rotor using said optimized arrangement of rotor components.

In accordance with a further general aspect, there is provided a method of assembling a rotor assembly of a gas turbine engine, the rotor assembly including a plurality of rotor components mounted between axially spaced-apart bearings, the method comprising the steps of: for an initial assembly of the rotor components, determining initial geometric data indicative of a radial deviation of a centre of mass of each rotor component relative to an axis of rotation of the assembly; determining an initial mass of each rotor component; using the initial geometric data and mass data to calculate unbalance forces at the rotor supports; calculating the bending moment distribution acting on the rotor induced by the rotor components; determining a set of rotor component stacking positions and associated bearing reactions which minimize bending moments in the rotor; and assembling the rotor assembly using said set of rotor component stacking positions.

In accordance with a further general aspect, there is provided a method of assembling a rotor assembly of a gas turbine engine having a plurality of components, the method comprising the steps of: determining bearing reaction loads and a bending moment induced by each component by using a mass and a center of mass location of each component; and determining an assembly bending moment distribution for a plurality of combinations of component stacking positions and mass corrections, determining a rotor arrangement which provides a lowest total bending moment for the assembly, defining the component stacking positions and mass corrections associated with the lowest assembly bending moment as optimal stacking arrangement; and assembling the rotor assembly using said optimal stacking arrangement.

In accordance with a further general aspect, there is provided a method of assembling a rotor assembly of a gas turbine engine having a set of rotor components, the method comprising the steps of: for each rotor component, determining a mass and a location of a center of mass with respect to an axis of rotation of the rotor assembly; using the mass and the location of the center of mass to determine a static unbalance force associated with each rotor component; summing the static unbalance forces of the rotor components to provide a total static unbalance force of the rotor assembly; providing an optimized rotor arrangement by optimizing at least one mass correction to be applied to the rotor components to thereby minimize the total static unbalance force of the rotor assembly; and assembling the rotor in the optimized rotor arrangement, including applying said at least one optimized mass correction to the set of rotor components.

In accordance with a further general aspect, there is provided a method of assembling a rotor assembly supported by at least two bearings, the rotor assembly including a plurality of rotor components each having a center of mass spaced-apart at fixed points along an axis of rotation of the rotor assembly, the method comprising the steps of: for an initial assembly of the components, acquiring geometric data indicative of a radial deviation of a center of mass from a datum for each component; acquiring mass data for each component; using the radial deviation and mass data to determine at least one of a total static unbalance force of the rotor assembly and a total static unbalance force at each bearing; determining at least one optimized mass correction to be applied to at least one of the rotor components providing at least one of a minimum total static unbalance force of the rotor assembly and a minimum total static unbalance force at each bearing; assembling the rotor, including applying said at least one optimized mass correction to the rotor.

In accordance with a further general aspect, there is provided a method of assembling a rotor assembly of a gas turbine engine having a plurality of components, each component having a mass, a center of mass and a plurality possible stacking positions relative to the other components, the method comprising the steps of: determining a static unbalance force vector for each component by using the mass and a location of the center of mass relative to a datum; determining a combination of component mass corrections providing a minimum total static unbalance force for the rotor assembly, including iteratively calculating said forces for a range of possible component mass correction combinations and selecting one of said possible combinations providing said minimum total static unbalance force for the rotor assembly; and assembling the rotor assembly using said combination of stacking positions.

In accordance with a further general aspect, there is provided a method of assembling a rotor assembly of a gas turbine engine having a plurality of rotor components mounted for rotation about an axis of rotation, each rotor component having a mass, a center of mass and multiple possible angular stacking positions with respect to the other rotor components, the method comprising the steps of: for a plurality of said possible stacking positions, determining a position of the center of mass of each of the components relative to an axis of rotation; for a plurality of said possible stacking positions, using the mass of each of the rotor components and respective positions of the centers of mass thereof to determine an associated static unbalance force of each rotor component; selecting a set of said rotor mass corrections which provide a minimal total static unbalance force for the rotor assembly; and assembling the rotor assembly using said selected set of rotor mass corrections.

Further details of these and other aspects will be apparent from the detailed description and figures included below.

DESCRIPTION OF THE DRAWINGS

Reference is now made to the accompanying figures in which.

DETAILED DESCRIPTION OF THE PREFERRED EMBODIMENTS

Figure 1:
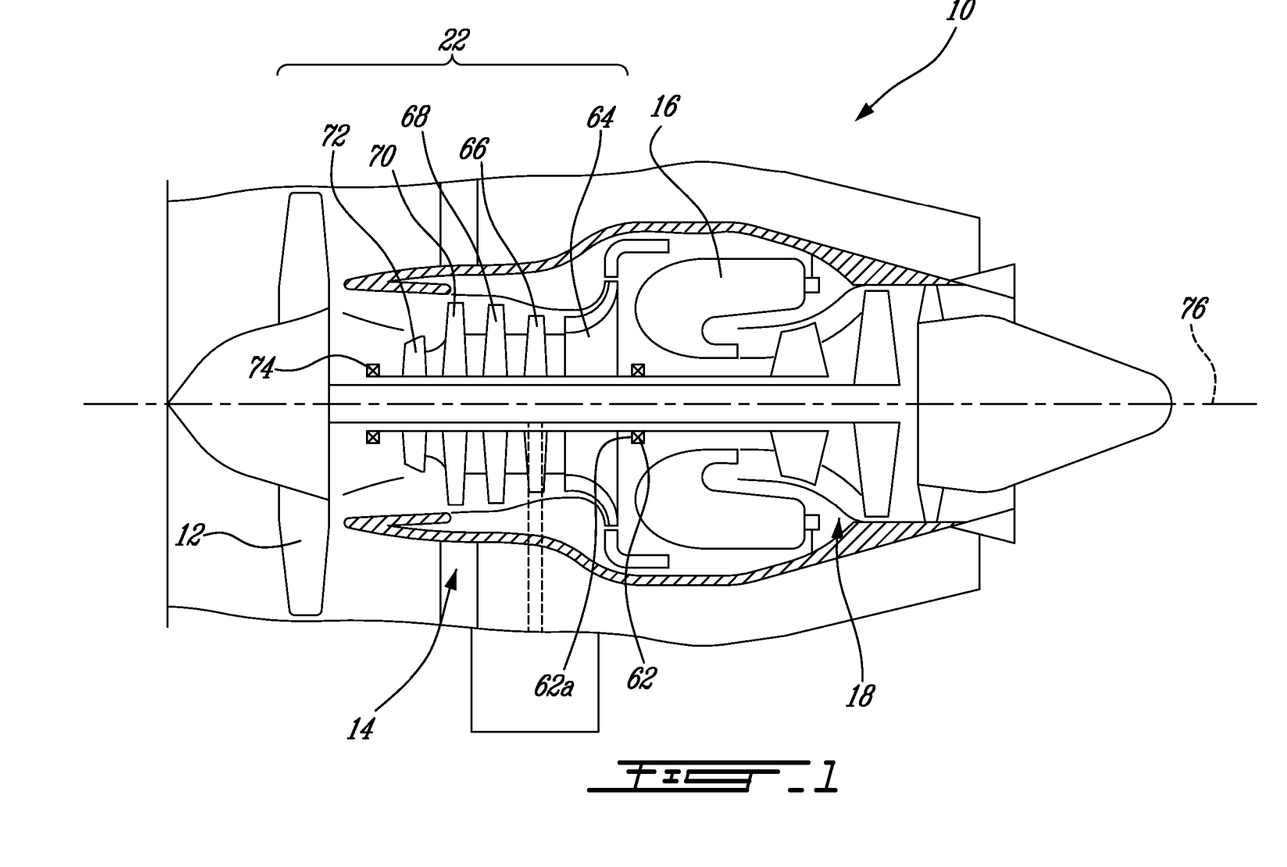
FIG. 1 is a schematic of a gas turbine engine including multiple rotor assemblies.

FIG. 1 illustrates a gas turbine engine 10 generally comprising, in serial flow communication, a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Generally, the gas turbine engine 10 comprises a plurality of rotor assemblies having multiple components. For instance, in the illustrated example, the compressor 14 includes a multi-stage high pressure compressor (HPC) 22 including five stages of annular rotor components 64, 66, 68, 70 and 72. Each of the five rotor components illustrated in FIG. 1 is provided with forward and aft mounting faces (unindicated). The components are mounted face-to-face. The forward rotor component 72 has a cylindrical forward end which defines a journal for mounting a forward bearing 74. The aft rotor component 64 has a cylindrical aft end which defines a journal for mounting in an aft bearing 62. The bearings 62 and 74 support the HPC rotor assembly 22 in the engine 10. The bearings 62 and 74 define the engine centerline 76 (i.e. the axis of rotation of the rotor assembly of the HPC rotor assembly 22).

Ideally, a high pressure compressor rotor assembly, such as assembly 22 shown in FIG. 1, should be coaxially mounted with the engine centerline 76 with minimal radial eccentricity to reduce rotor imbalance during engine operation. Although each rotor component of a gas turbine engine is manufactured under very tight tolerance constraints, it remains that even the best made components are slightly off-center or out-of-balance in some respect. The effect of such slight eccentricities becomes considerable for larger components, thereby capable of causing significant radial rotor deflection and, therefore, vibration. For instance, a concentricity deviation of the mating surfaces between the two mounting ends of a rotor component may lead to an assembly unbalance if not taken into account when providing a rotor assembly including the component. Furthermore, if the axial faces at the two mounting positions of a rotor component are not perfectly parallel to one another, a planar deviation exists which is also capable of causing a rotor assembly unbalance. Centers of masses may also be off-set from the axis of rotation, also leading to unbalance. Thus, the factors to consider are many.

It is well known that high pressure rotor assembly unbalance can be minimized by adjusting the relative circumferential positions, or stacking angle, of each component in relation to the other rotor components so as to cumulatively minimize the de-balancing effect of the concentricity deviations and the lack of squareness of the mounting ends of the rotor components. The stacking angle of each component is adjusted by rotating the component relative to an adjoining component about a datum or nominal centerline axis in the rotor stack. Therefore, the key to rotor balancing is to correctly determine what stacking angles are required to minimize unbalance.

Figure 2:
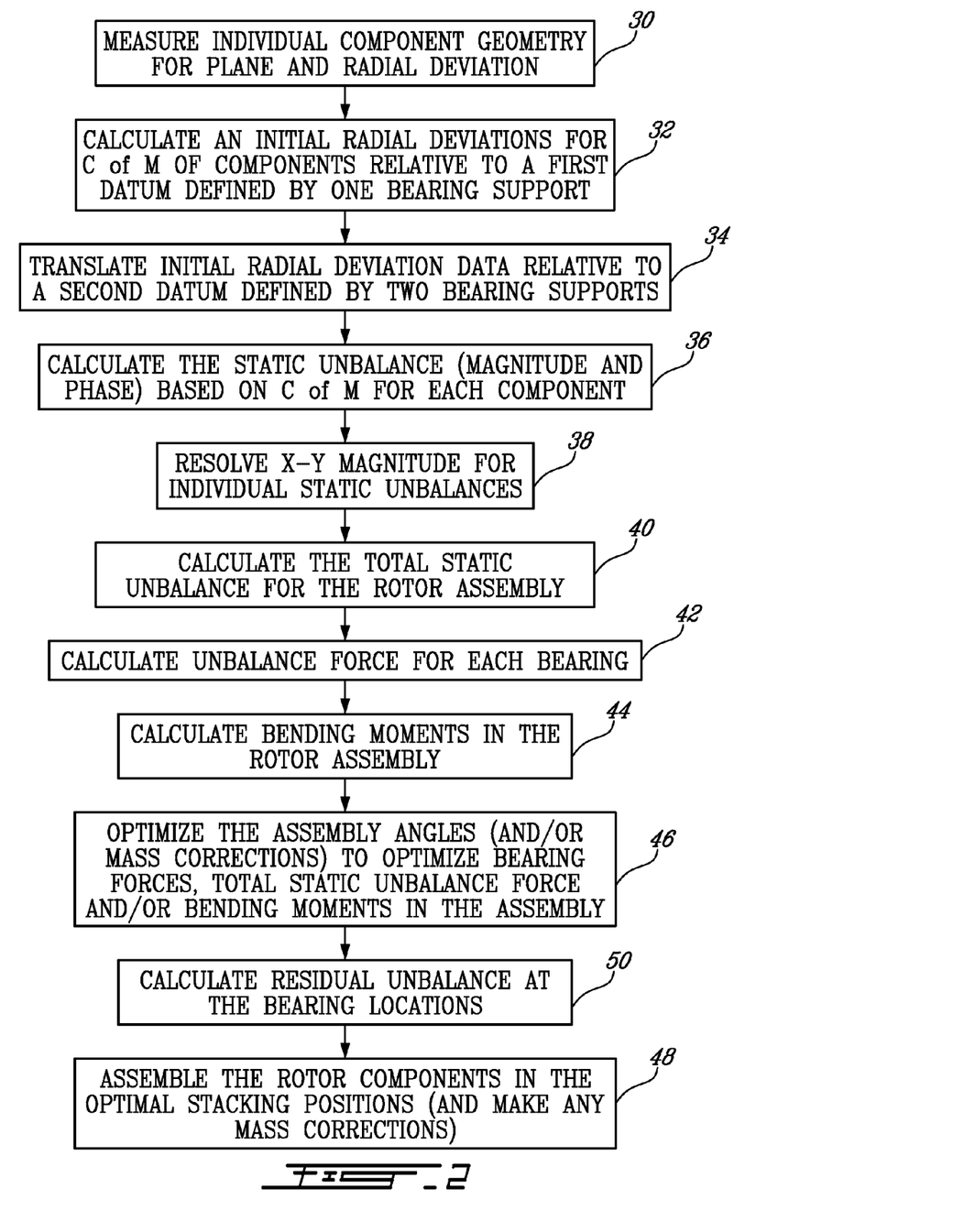
FIG. 2 is a flow chart showing a method of balancing a rotor assembly of the gas turbine engine of FIG. 1 in accordance with a particular embodiment of the present invention.

FIG. 2 is a flow chart representing new methods, described further below, that can be used to balance the HPC rotor assembly 22 or any other rotor assembly of a gas turbine engine. The method of FIG. 2 comprises steps 30 through 50 further described below. FIGS. 3 through 14 illustrate various steps of the methods of FIG. 2 applied to the HPC rotor assembly 22.

Now referring to FIG. 2, the step 30 involves measuring the individual rotor components 64-72 for radial (concentricity) and planar (parallelism) deviation at the forward and aft mounting ends thereof, for example, using the approach described above, or any other suitable method of doing so.

As indicated in step 32 of FIG. 2, this geometric data is then used (e.g. by being provided as input to a suitable software routine, such as those already commercially-available and suitable or adaptable for such tasks) to determine initial predictions for component stacking positions based on these geometric parameters, as follows.

Figure 3:
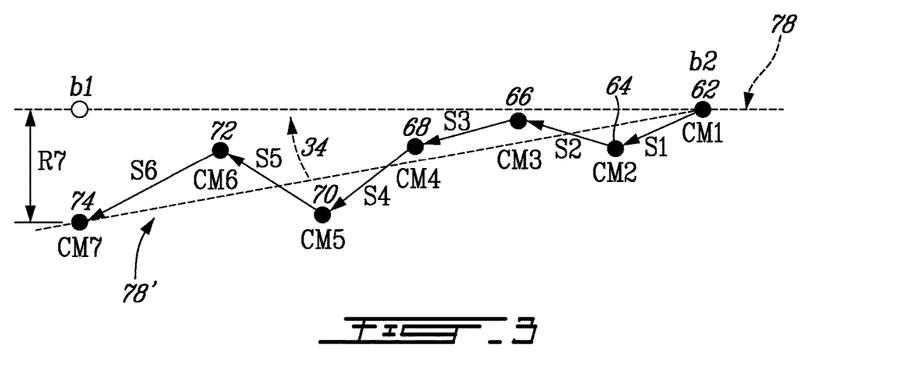
FIG. 3 is a schematic showing a plot of the geometric deviation vectors when the components or a rotor assembly are arranged in initial component stacking positions relative to a first datum axis.

As shown in FIG. 3, the aft bearing 62 is selected to define a first datum 78 axis for use in stacking, the first datum being defined as a line normal to the bearing face 62a and passing through the bearing journal or center b2. The initial predictions for assembly stacking angles, calculated in step 32, have been calculated using the measured radial and planar deviation data to minimize assembly eccentricity relative to first datum 78. (However, it will also be understood that the first datum axis 78 could instead be determined relative to the forward bearing 74). Specifically, referring again to FIG. 3, the geometric deviations of the components are represented by arrows S1-S6. The planar & radial deviations at the forward mating face of the first component 64 are measured with respect to the bearing position 62. The second component 66 is positioned/stacked relative to the first component 64 so as to off-set (as much as possible) the planar and radial deviations of the first component 64 (represented by arrow S2 in FIG. 3). The third component 68 is positioned/stacked to off-set (as much as possible) the summation of planar & radial deviations of the first and second components 64, 66 combined (represented in FIG. 3 by arrows S3 and S1+S2, respectively). The initial prediction for stacking position of each subsequent component of the assembly and the forward bearing 74 is also determined in a similar fashion. A person skilled in the art will appreciate that any other suitable method of determining initial predictions for stacking positions based on the geometric data of the components of an assembly may be employed. The skilled reader will also understand that the above stacking exercise will preferably occur analytically, rather than by physically building a rotor.

Referring still to FIG. 3, center of mass data for each component is also desired. Any suitable method may be used to determine the center of mass of each component. In a preferred approach, a finite element analysis used to calculate the actual axial position (i.e. the Z dimension in FIG. 4) of the center of mass for each component, while a linear interpolation of the radial deviations of the two end point mounting positions of each component is used to calculate the radial deviations of the centers of mass. Other suitable techniques may be employed instead/as well. The radial deviations of the centers of mass of components 64-72 and the forward bearing 74 relative to first datum 78 are also calculated. FIG. 3 shows the radial deviations of the centers of mass of components 64-72 and of bearings 62 and 74 expressed graphically as interconnected points CM1 through CM7, respectively. More specifically, what is shown is the location (i.e. radial deviation) of each of the centers of mass CM1 through CM7 with respect to the first datum 78. Because it was used to define the first datum 78, the center of mass CM1 of the aft bearing 62 necessarily coincides with the first datum. The skilled reader will appreciate that the foregoing is a baseline representation of the rotor which may be obtained using conventional assembly balancing techniques and software, based upon acquired geometric deviation data. This baseline is then used in the present method, as will now be described.

Figure 4:
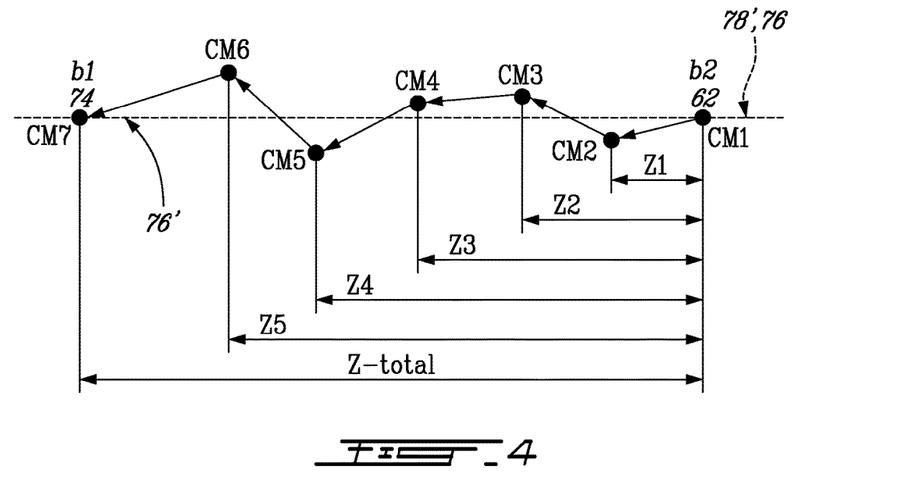
FIG. 4 is a schematic similar to FIG. 3, showing the same center of mass data but this time relative to a second datum defined relative to both bearings supports, to thereby provide a datum representative of the rotor centerline as defined by the two bearing supports.

Defining the first datum in this manner, however, is somewhat arbitrary. Therefore, according to the present method, it is desirable to continue the analyses to re-define the center of mass locations for all rotor components relative to a second datum which better reflects the actual centerline of rotation of the rotor assembly. Referring concurrently to FIGS. 2 and 4, the step 34 involves redefining the datum axis from first datum 78 to second datum 78', which may be done by conceptually translating relative radial deviation data for the center of mass of the forward bearing 74 to "zero" deviation. The second datum 78' represents the rotational axis of the bearings 62 and 74, and thus provides a second datum which may be used to balance the rotor. Thus, one translates (e.g. through the use of a suitable computer subroutine) the center of mass radial deviation data point CM7 to "align" with the second datum 78' defined together with center of mass radial deviation data point CM1, and adjusts the points CM2 through CM6 accordingly so that they are correctly expressed relative to the new datum, as shown graphically in FIG. 4.

Any suitable manner of re-expressing the data with reference to the second datum may be used. An illustrative example of a suitable translation step can be described conceptually as "pivoting" the interconnected centers of mass CM1-CM7 about point b2 of FIG. 3 "towards" the 1st datum 78 (thus conceptually aligning datums 78 & 78') while maintaining the relative position of the centers of mass CM1-CM7. The interconnected centers of mass CM1-CM7 are "pivoted" until CM7 reaches the datum line 78, thereby aligning the aft and forward bearings 62, 74 of the rotor assembly 60 with the datum line (representative now of axis of rotation of the assembly). The translation takes into account the axial positions of the centers of mass CM1-CM7 relative to the bearing locations b1 and b2. Axial distances from point b2 to the centers of mass CM2 to CM7 are identified by Z1, Z2, Z3, Z4, Z5 and Ztotal in FIG. 4. Thus, the translation of CM2-CM6 is proportional to the translation of CM7 to the datum line.

For example, the translation of CM6 from its "old position relative to the first datum 78 to its "new" position relative to second datum 78', can be calculated by the following equation:

$$Rd6 = R7 - R6\left(\frac{Z5}{Ztotal}\right)$$

where Rd6 is the new radial distance of CM6 to the second datum 78' once CM7 has been translated to zero, R6 and R7 are the initial predictions for radial deviations of the centers of mass CM6 and CM7 relative to the first datum 78, as shown in FIG. 3, and Z5 and Ztotal are the axial distances of CM6 and CM7 respectively relative to point b2 (i.e. bearing 62).

The translation of centers of mass CM2 to CM5 relative to the centerline 76 (i.e. second datum 78') is similarly calculated using the above equation but substituting the appropriate data respective to each center of mass. Notably, the R7 and Ztotal variables in the above equation remain constant as the intermediate components 64-72 of the rotor assembly 60 are considered with respect to the translation of the forward bearing 74 to the datum axis.

Figure 5:
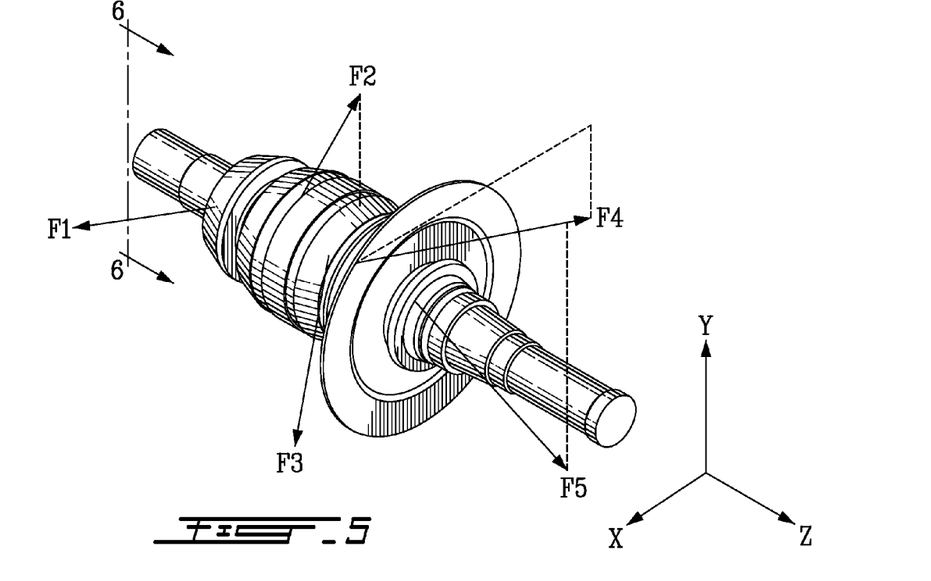
FIG. 5 is an isometric view of a high pressure compressor rotor assembly of the engine of FIG. 1, showing arrows representative of example static unbalance forces in an XYZ coordinate system.

Now referring concurrently to FIGS. 2 and 5, in one aspect the method comprises determining a static unbalance mass factor, or static unbalance force of the assembly. This is done in the example presented in FIG. 2 by determining the static unbalance force for each component (step 36) and then adding the unbalances (steps 38 and 40) to acquire a total static unbalance for the rotor assembly). Steps 36-40 will now be discussed in more detail.

Figure 6:
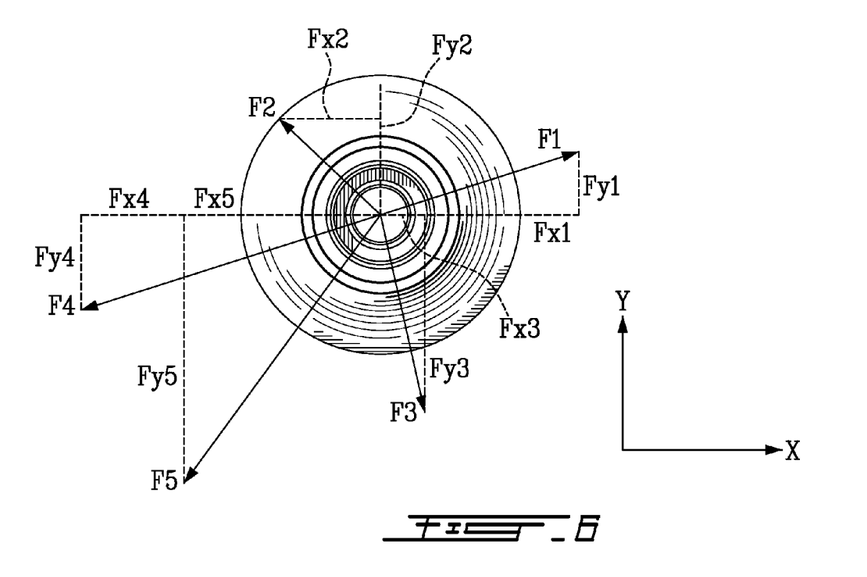
FIG. 6 is a view taken along A-A of FIG. 5, showing X and Y force components of FIG. 5 resolved from the static unbalance forces.

As mentioned, the static unbalance force associated with each component is determined (step 36 in the flow chart of FIG. 2). Thus, the static unbalance force of each of the five rotor components 64-72 between bearing 62 and 74 is determined. The radial deviation at the center of mass for each component and the component's mass are used to calculate a static unbalance force for each of the five rotor components 64-72. More specifically, this may be achieved when the "translated" radial deviations of the centers of mass CM2-CM6 of the respective components 64-72 relative to the second datum axis 78' are multiplied by the respective component masses to obtain five static unbalance force vectors F1-F5, as illustrated in FIGS. 5 and 6, associated respectively with the five rotor components 64-72. An XYZ coordinate system is defined in FIG. 5 to orient the component static unbalance forces F1-F5 in space. The Z axis extends axially, nominally along the rotor shaft axis, and the X and Y axes extend orthogonally radially therefrom. The direction of the static unbalance forces F1-F5 is determined by the location (i.e. radial deviation) of the centers of mass CM2-CM6 such that the force vectors passes therethrough from the datum axis 78', and extending radially outwards (see FIG. 6). (It will be understood that the vectors F1-F5 remain within a given X-Y plane). The magnitude of each unbalance vector corresponds to the product of the mass/weight of the rotor component and the radial deviation of its center of mass. It should be noted that throughout this application references to unbalance forces are, in the present examples, actually unbalance levels (i.e. typically expressed in units of oz-in), and thus not forces, per se. However, the skilled reader will appreciate that, once an unbalance level is determined, the resulting unbalance force is derived from the product for the unbalance and the square of the rotational speed. Consequently, it will be understood that minimizing static unbalance levels will inherently also minimizes static unbalance forces (and hence the terms unbalance and unbalance forces tend to be used interchangeably).

Next, as shown in step 38 of FIG. 2, in order to sum the individual unbalances, the X and Y magnitudes and signs (i.e. directions) of the static unbalance forces F1-F5 are resolved (step 38 in FIG. 2), so that the components of the vectors can then be summed. (Any suitable approach for summing the individual force unbalance vectors may be used.) For example, since F1-F5 are X-Y planar, the X and Y components for each static unbalance force vectors F1-F5 may be calculated and summed as follows:

Static Unbalance Force in the X Direction $$Fx = Fx1 + Fx2 + Fx3 + Fx4 + Fx5$$

Static Unbalance Force in the Y Direction $$Fy = Fy1 + Fy2 + Fy3 + Fy4 + Fy5$$

In step 40 of FIG. 2, the total static unbalance force of the rotor assembly is then calculated as follows:

$$F(total) = \text{sqrt}(\Sigma Fx^2 + \Sigma Fy^2) \qquad \text{Equation (1)}$$

Referring still to FIG. 2, balancing a rotor assembly may optionally involve the step 46 of optimizing the total static unbalance force of the rotor assembly. Any suitable optimization approach may be used. In the example described herein, optimization is achieved by iteratively considering various possible component stacking positions/angles, and determining an optimized stacking position for the components which results in the lowest rotor assembly static unbalance force (e.g. forcing F(total) of Equation (1) to zero).

Figure 7:
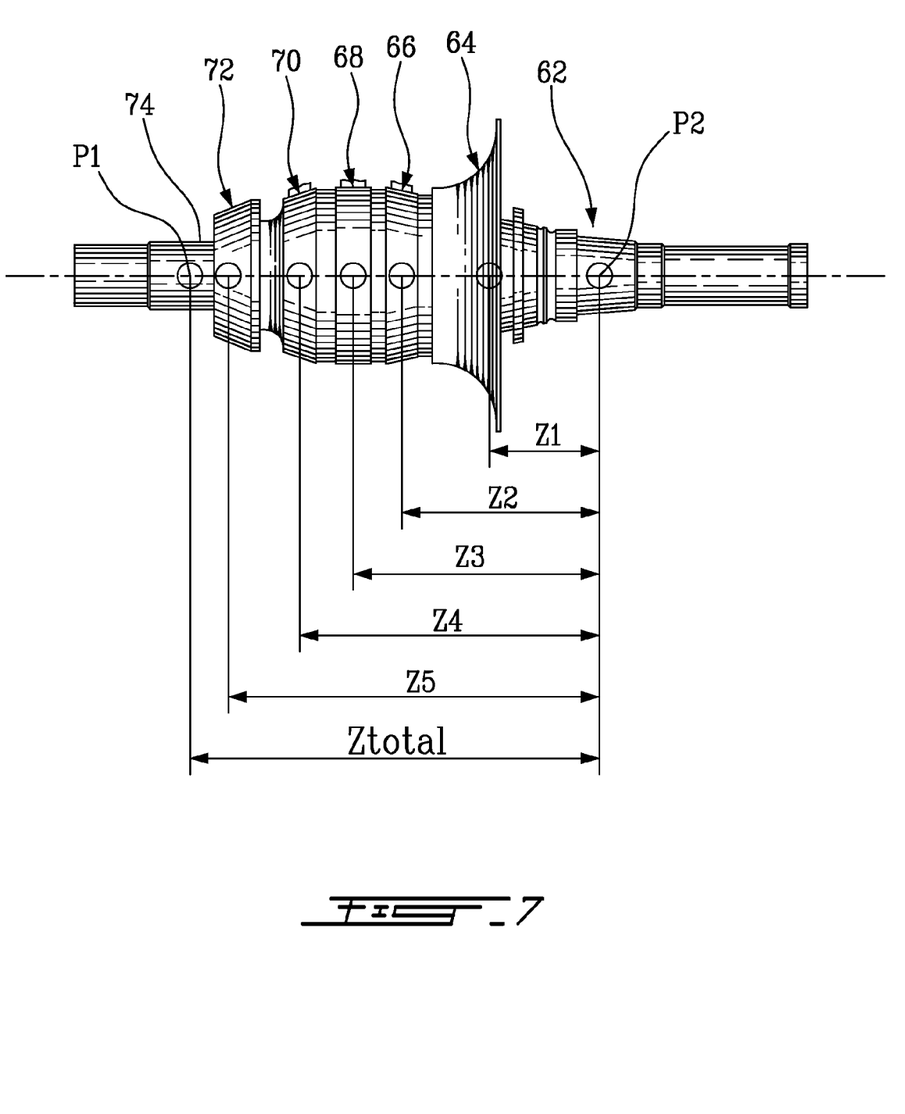
FIG. 7 is a side view of the rotor assembly of FIG. 5 showing Z positions of the component centers of mass.

The total static unbalance force acting on each of the forward and aft bearings 74 and 62 can also optionally be calculated, indicated as step 42 of FIG. 2. Any suitable manner of doing so may be used. In the example presented below, the calculation is based on the Z (axial) positions of the centers of mass of the intermediate components 64-72 relative to the Z (axial) positions of the forward and aft bearings 74 and 62, as shown in FIG. 7. The X and Y components for each static unbalance force acting on forward and aft bearings 74 and 62 are calculated and summed as follows:

Static Unbalance Force on Forward Bearings 74 (b1) in the X Direction $$Fxb1 = Fx1*Z1/Ztotal + Fx2*Z2/Ztotal + Fx3*Z3/Ztotal + Fx4*Z4/Ztotal + Fx5*Z5/Ztotal$$

Static Unbalance Force on Forward Bearings 74 (b1) in the Y Direction $$Fyb1 = Fy1*Z1/Ztotal + Fy2*Z2/Ztotal + Fy3*Z3/Ztotal + Fy4*Z4/Ztotal + Fy5*Z5/Ztotal$$

Static Unbalance Force on Aft Bearing 62 (b2) in the X Direction $$Fxb2 = Fx1*(Ztotal-Z1)/Ztotal + Fx2*(Ztotal-Z2)/Ztotal + Fx3*(Ztotal-Z3)/Ztotal + Fx4*(Ztotal-Z4)/Ztotal + Fx5*(Ztotal-Z5)/Ztotal$$

Static Unbalance Force on Aft Bearing 62 (b2) in the Y Direction $$Fyb2 = Fy1*(Ztotal-Z1)/Ztotal + Fy2*(Ztotal-Z2)/Ztotal + Fy3*(Ztotal-Z3)/Ztotal + Fy4*(Ztotal-Z4)/Ztotal + Fy5*(Ztotal-Z5)/Ztotal$$

Next, the total static unbalance force acting on each of the forward and aft bearings 74 (b1) and 62 (b2) is calculated as follows:

Total Static Unbalance Force on Forward Bearings 74 (b1)

$$Fb1(total) = \text{sqrt}(\Sigma Fxb1^2 \pm \Sigma Fyb1^2)$$

Total Static Unbalance Force on Aft Bearing 62 (b2)

$$Fb2(total) = \text{sqrt}(\Sigma Fxb2^2 \pm \Sigma Fyb2^2)$$

The static unbalance forces on each bearing are thus ascertainable, as a function of axial positioning, mass and radial deviation of center of mass of the individual components. A balanced rotor may be thought of as one for which static unbalance forces on each bearing are minimized. As indicated in step 46 of FIG. 2, optionally the static unbalance forces on each bearing may be used (i.e. either with or without other techniques) to determine optimal rotor stacking angles. As mentioned, optimization may be achieved in any suitable fashion. A preferred approach is to use a suitable optimization computer program, such suitable as commercially-available optimization software, to iterate the possible combinations of component stacking angles (i.e. iterate on possible component stacking angles such that the resulting static unbalance force and/or the bending force unbalance are as close to zero as possible. The output of such an optimization is preferably at least a set of component stacking angles required to achieve the optimized solution. The set of component stacking angles and/or one or more correction weights may then be provided as the rotor assembly instructions to the assembler, as will now be discussed.

Figure 8:
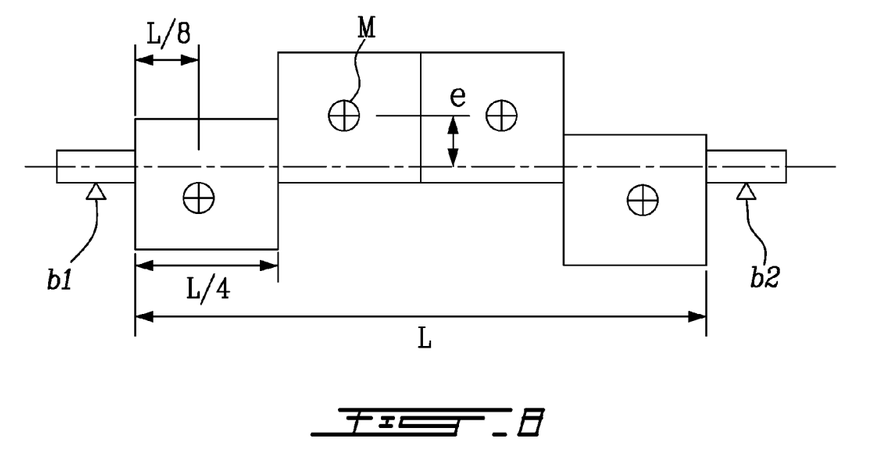
FIG. 8 is a schematic view of an example rotor assembly showing component relative stacking positions which result in zero bearing forces and non-zero bending moments.
Figure 9:
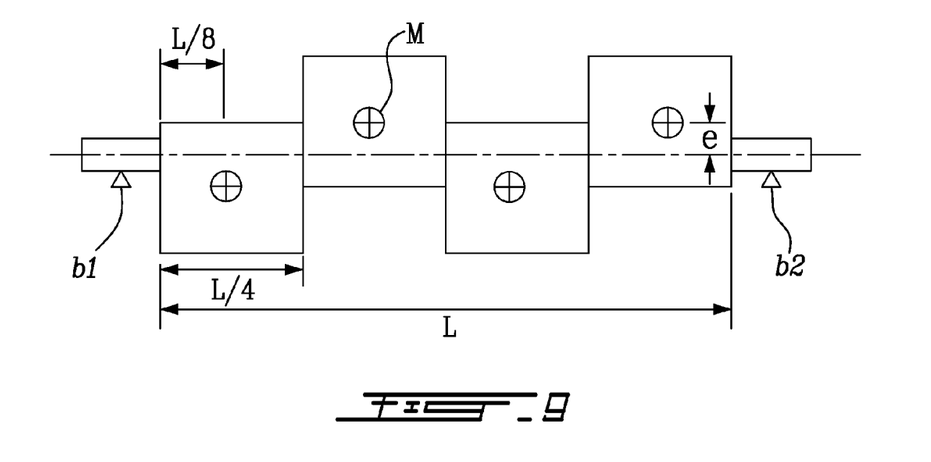
FIG. 9 is a schematic view of the rotor assembly of FIG. 8, this time showing the component relative stacking positions which result in zero bearing forces and zero bending moments.

In another aspect of step 44 of FIG. 2, the present method of balancing the rotor assembly optionally includes determining and optimizing (step 46) the internal bending moments or reaction forces within the rotor. It has been found that a rotor assembly that is balanced at low speed (i.e. has zero static forces at the bearings) may still have large internal moments or bending forces which can create rotor deflections and the associated unbalance during high speed engine operation. For example, FIG. 8 shows an example four-component rotor where the total static unbalance force of a rotor assembly is zero, but the mid span bending forces reacted within the rotor remain significant, which can lead to rotor deflection and vibration. In contrast, FIG. 9 shows the same rotor stacked differently, and in this stacking the total static unbalance force of a rotor assembly is also non-zero, but the unbalance bending forces at mid span are zero, reducing rotor deflection or bending that would otherwise lead to the creation of additional unbalance forces. Considering the simplified example of FIG. 8 in more detail, an unbalance load M*e (i.e. the product of mass M and radial deviation e) is exerted by each rotor component along a shaft of length L, and therefore the total static unbalance force is:

$$F(\text{total}) = 2Me - 2Me = 0$$

and the sum of the moments about each bearing is also zero, so the rotor is statically and dynamically balanced:

$$\Sigma M(Fb1) = ML/8 - 3ML/8 - 5ML/8 + 7ML/8 + Fb2L = 0, \text{ or } Fb2 = 0$$

$$\Sigma M(Fb2) = ML/8 - 3ML/8 - 5ML/8 + 7ML/8 + Fb1L = 0, \text{ or } Fb1 = 0$$

where Fb1 and Fb2 are the bearing support forces, and the sum of the moments are the moments about center (L/2) as reacted by the fixed ends (i.e. the bearings). As the skilled reader will appreciate, the maximum moment MeL/4 occurs in the center portion of the rotor.

In comparison, considering the simplified example of FIG. 9, while the total static unbalance force (F(total)) is the same as for FIG. 8 (i.e. zero), the bearing forces are not zero. By summing the moments about each bearing the support forces (Fb1, Fb2) can be determined. In a dynamically balanced rotor the bearing moments are zero, therefore:

$$\Sigma M(Fb1) = MeL/8 - 3eML/8 + 5MeL/8 - 7MeL/8 + Fb2L = 0, \text{ or } Fb2 = Me/2$$

$$\Sigma M(Fb2) = MeL/8 + 3eML/8 - 5MeL/8 + 7MeL/8 + Fb1L = 0, \text{ or } Fb1 = -Me/2$$

where Fb1 and Fb2 are the bearing support forces, and the sum of the moments are the moments about center (L/2) as reacted by the fixed ends (i.e. the bearings). The skilled reader will appreciate that it can be shown that the maximum moment is MeL/16, or ¼ of the magnitude represented by the rotor of FIG. 8.

Alternatively, as discussed further below, a bearing force calculation of this nature can also be used as a balance correction calculation. Adding the bearing force or unbalance calculated above to the rotor as a correction mass (i.e. placed on the rotor at a specified/known correction plane, as in known in the art) can result in both rotors being statically and dynamically balanced. Therefore optimization may be done on correction masses, rather than or in addition to stacking angles, as will be discussed further below.

Rotor moments may be determined (44) and optimized (46) in any suitable manner. In one example shown in FIG. 10, the rotor may be considered to be a beam simply supported at each by the bearings and having external point-loadings corresponding to the static unbalance force of each component (a four-component rotor in a stacking arrangement similar to FIG. 8 is considered in FIG. 10). Component displacements multiplied by their mass (as well as any correction masses multiplied by their radius) provide the beam forces at various locations along the rotor length. The solution for the moment distribution may then follow suitable known approaches for determining beam shear, moment loads and deflections along the beam (i.e. along axis of the rotor). The bearing forces may then be calculated by summing and equating the moments to zero about each support (i.e. bearing) or correction plane, as the case may be. The bearing/correction forces (i.e. Fb1, Fb2) can be determined as the required reaction loads, as would usually be the case when applying typical mechanics methods to beam analysis. The moments can then be summed along the beam. Alternatively, correction forces can be calculated at any suitable number of stations along the rotor, in the same or other suitable way.

Figure 10:
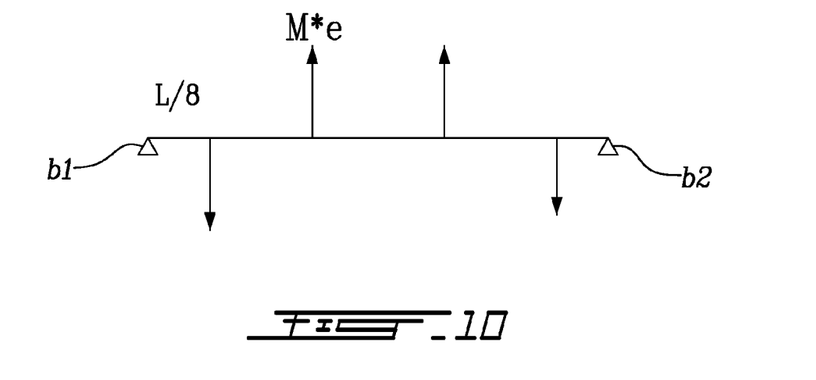
FIG. 10 is a schematic view of a rotor assembly illustrating loading which results from rotor unbalances present in the rotor of FIG. 8.
Figure 11:
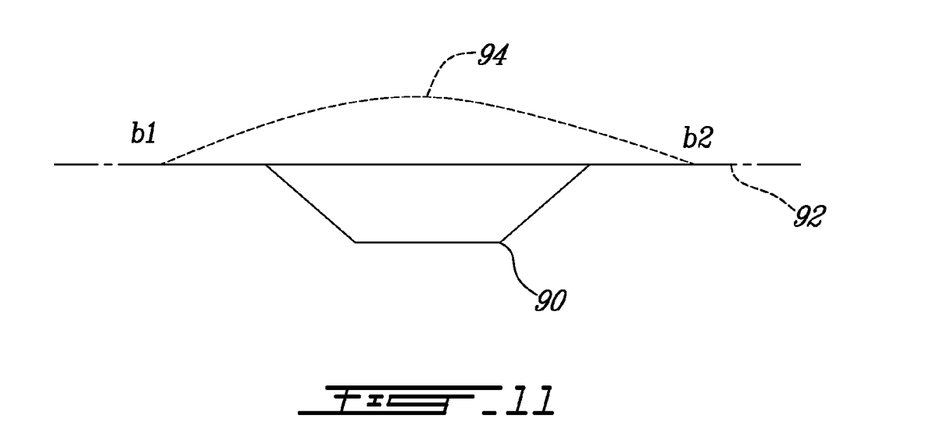
FIG. 11 is a moment diagram representing the rotor assembly loading condition shown in FIGS. 8 and 10.

Shown in FIG. 11 is a representation of the rotor of FIGS. 8 and 10, wherein the solid line 90 represents bending moment level as a function of shaft position, the centreline 92 is the nominal centreline between the bearings b1, b2, and the dotted line 94 shows a resulting shape (exaggerated for illustration purposes) of the shaft reacting the internal bending moments due to unbalance forces. It can be seen from FIG. 11 that the maximum bending moment (occurring at the center of the beam in this case) is:

$$M(\max) = MeL/4$$

while the bending moment area of FIG. 11 (i.e. the area under the curve 90 relative to the nominal centreline 92) is:

$$M(\text{area}) = MeL^2/8$$

Figure 12:
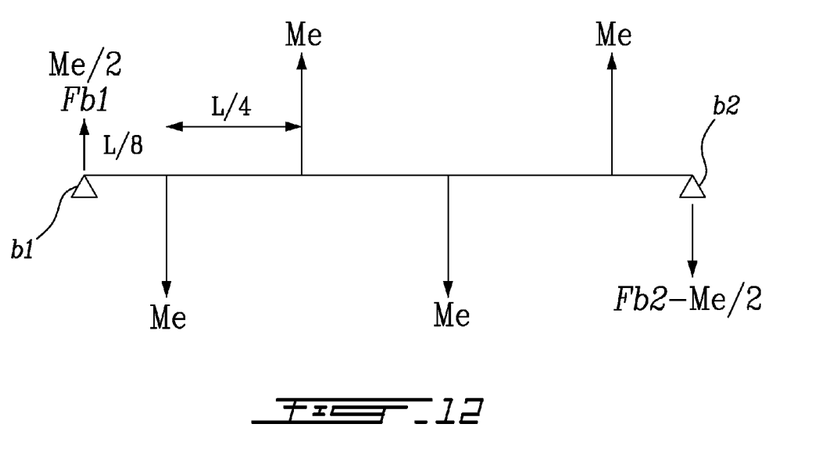
FIG. 12 is a loading diagram similar to FIG. 10, representing the rotor assembly loading condition shown in FIG. 9.
Figure 13:
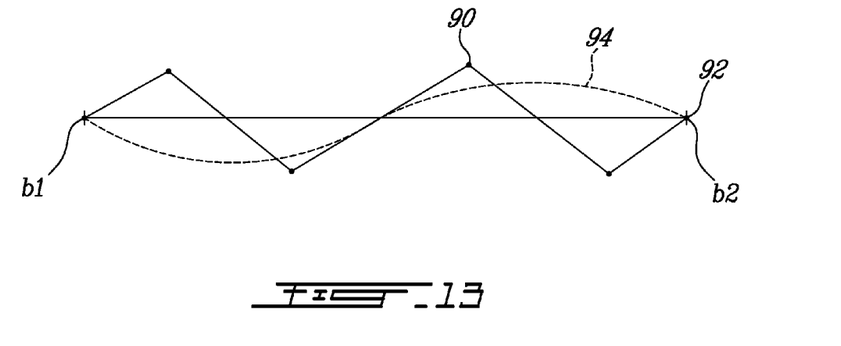
FIG. 13 is a moment diagram similar to FIG. 11, representing the rotor assembly loading condition shown in FIG. 9.

In contrast, shown in FIGS. 12 and 13 are a loading diagrams and a bending moment diagram, respectively, similar to those of FIGS. 10 and 11, corresponding to the rotor of FIG. 9. As shown in FIG. 12, the correction forces calculated above (i.e. ±Me/2) have been notionally added to the rotor of FIG. 9, as balance correction masses applied at the bearing supports, for purposes of calculating rotor bending moments. The maximum bending moment is distributed along the shaft and occurs in four places:

$$M(\max) = MeL/16,$$

however for this rotor balancing, the moment area is:

$$M(\text{area}) = 0$$

That is, the internal bending moments are more balanced for the rotor of FIG. 9 as compared to the rotor of FIG. 8.

It will be understood that the maximum moment in the rotor is not necessarily related directly to a maximum shaft or rotor deflection. Rotor deflection is related to the sum of each moment area times the moment centroidal distance to a given location on the shaft. Preferably, therefore, the objects of the moment calculations are to a) minimize the absolute deflection level at key areas like mid span of the bearing supports and/or b) minimize deflections that are similar to the natural frequency deflection or mode shapes of the rotor system. The initial (i.e. simpler) criterion for optimization is preferably minimizing deflection in critical area(s), such as rotor mid span and/or an aft support area of the rotor, and as experience with the dynamic characteristics of a particular rotor design is acquired, other criteria, such as minimizing deflections similar to the natural frequency deflection, may be used to further enhance rotor balancing.

As mentioned, suitable software is commercially available to calculate moments as a function of axial position for a beam with identified loads, as well as to calculate resulting rotor internal bending forces, and to calculate the deflection shape or elastic curve of the rotor. Any or all of these properties may be used in optimizing rotor stacking angles, as will now be further discussed.

Referring again to FIG. 2 step 44, the bending moments of the rotor assembly 22 may be considered in balancing the rotor. While bending moment may be considered in any suitable manner, in the example present herein, the internal bending moments resulting from the unbalance of each of the components 62-72 are individually calculated and optimized for the rotor assembly. The bending moments resulting from the force unbalance associated with each rotor component are calculated for various stacking angles, with a goal of minimizing the maximum bending moment (M(max)) as well as minimizing the bending moment area (M(area)), as discussed above.

Preferably, the bending moment optimization is done at the same time as the static unbalance force optimization. However, the method of balancing a rotor assembly using bending moments analysis may optionally be carried out considering only the bending moments—i.e. without also considering the static unbalance force. In such an analysis, the correction or bearing forces (Fb1, Fb2) are calculated for use in the bending force unbalance for the assembly, and then optimized by way of iteration as described above. The optimal assembly bending moment unbalance is determined (i.e. M(max) and M(area) are minimized) and the corresponding stacking positions are output as the optimal stacking positions, or used in determining and placing correction masses.

The skilled reader will appreciate that optimizations result in compromise. For example, when considering rotor unbalance and rotor moments, a reduction of one may not result in a reduction of the other. Depending on the circumstances, one approach may be better than the other. For example, for a flexible rotor, which deflects easily in the presence of internal moments (whereas a rigid rotor does not), it has been found that a moment-based optimization will tend to yield better results than an unbalance optimization—hence if only one is to be done, although any of the above may be employed, a moment optimization tends to be preferred. If multiple correction planes are available, a two variable optimization (i.e. moment and unbalance) are preferably both used.

As shown as step 48 in FIG. 2, the components 64-72 of the rotor assembly 60 are then physically stacked in the optimal stacking positions to thereby provide a rotor with minimal static unbalance force, minimal bearing forces and/or minimal bending moments, as the case may be, according to the above teachings. More specifically, the components 62-74 are assembled, preferably one by one, in sequentially order, preferably from the last compressor stage forwards. Depending on the mechanical connections provided, the rotor components may be assembled using the assembly angles rounded to the nearest bolt holes of such connections.

As mentioned, stacking the rotor preferably begins at one end, with the first component 64 being positioned in a suitable fixture. The second component 66 is positioned adjacent the mating face of the first component 64 and rotated until the angular position thereof relative to the first component 64 is optimal, according to the a set of instructions output by the above process. The remaining components 68 to 72 are stacked in a similar manner.

One will appreciate that an optimized rotor assembly will typically continue to include some deviation and unbalance. The deviation and unbalance data calculated as described above, however, may be used to guide the selection and placement of correction masses to the rotor. As indicated in step 50 of FIG. 2, To achieve such a result, residual unbalance forces at the bearings are calculated and correction masses are added to (or mass suitably removed from) the assembled rotor.

Optionally, correction masses may be taken into consideration during the above described optimization process of step 46. For example, rather than optimizing on assembly (stacking angles) as described above, optimization may rather (or additionally) focus on corrections to mass to provide the desired balance. The method of balancing embodied herein allows the correction forces to be examined at the same time as (or in preference to) the static and/or bending forces. Correction unbalances are determined by the product of the correction mass(es) and radial (X-Y) placement(s) applied at a given axial (Z) position along the rotor length. Therefore, calculating the correction masses may in fact be done ahead of the rotor build stage, which further assists in achieving a zero force balance by allowing correction masses to be installed during rotor build, perhaps at planes along the rotor which are inaccessible once the rotor is fully assembled. It will be understood that if the unbalance generated by a component mass displacement is corrected by mass removal/addition at the component's center of mass, or close by, both the unbalance forces and bending moments will be simultaneously minimized in the rotor assembly.

Figure 14:
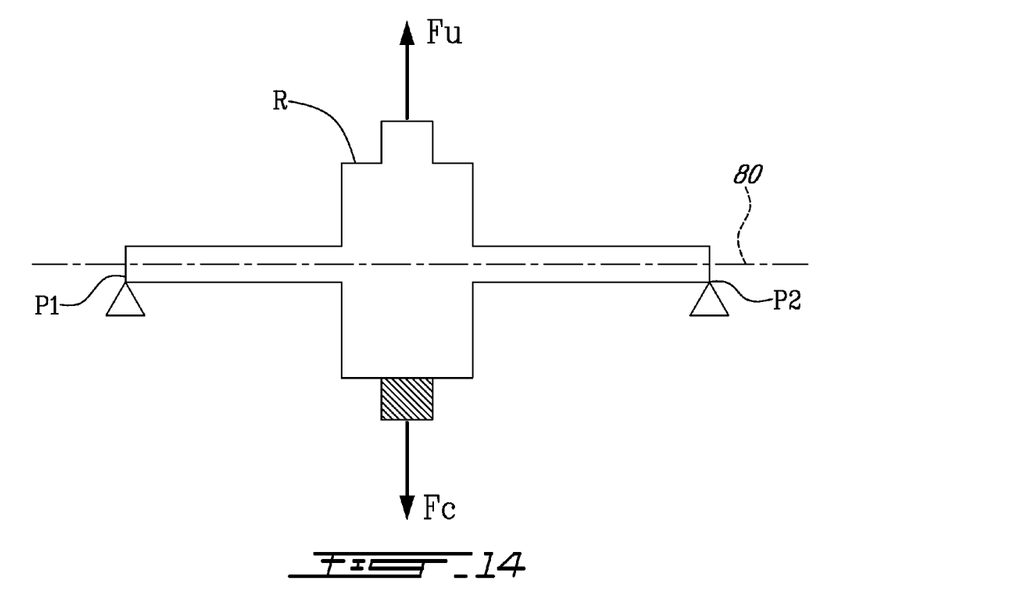
FIG. 14 is a schematic view of another example rotor assembly with a correction mass at the center.
Figure 15:
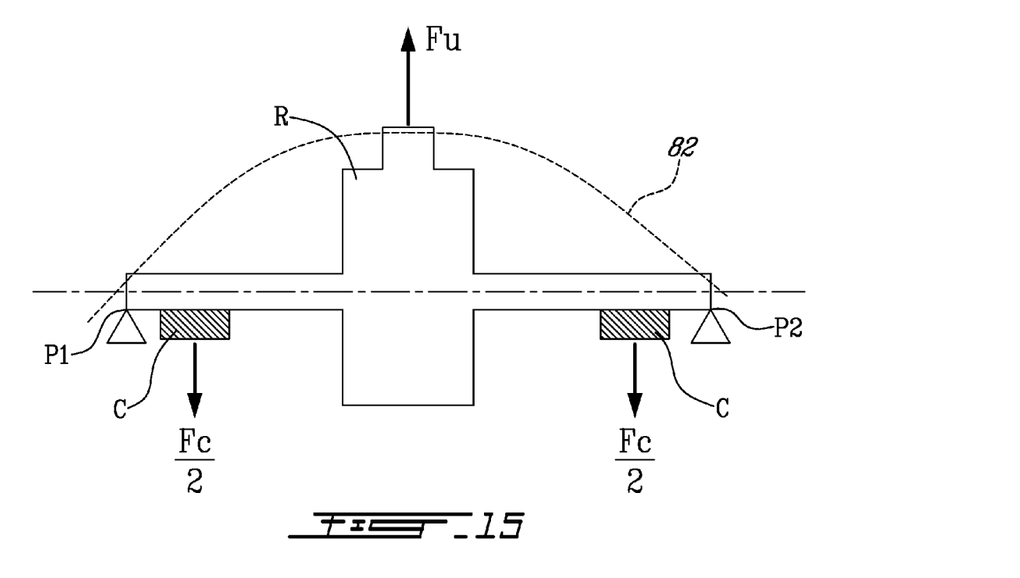
FIG. 15 is a schematic view of the rotor assembly of FIG. 14 with a pair of correction masses at opposed ends of the rotor.

FIGS. 14 and 15 are illustrative examples showing the influence of the location of correction masses. In the presence of a force unbalance Fu at the axial center of the rotor assembly R, the addition of a correction mass C, providing an opposing force Fc such that Fc=Fu, placed in the axial center (in this example) of the rotor R balances the rotor assembly R both statically and dynamically (i.e. both unbalance forces and bending moments are countered). It can be seen that the rotor deflection shape for the rotor assembly R, denoted by line 80, remains aligned with the axis of rotation, and hence a well-balanced rotor assembly results. However, in comparing FIG. 14 with FIG. 15, it can be seen that if a pair of correction masses C, each providing an opposing force Fc/2 such that Fc=Fu, is added at axial ends of the same rotor assembly R, the rotor assembly R is both statically balanced (i.e. static unbalance forces are balanced, but bending moments are not—i.e. a moment exists within the rotor at centre span, as is well understood by the skilled reader). This rotor would result in a bowed rotor deflection shape, denoted by the line 82, during engine operation, particularly with flexible rotors turning at high speed, which may result in rotor vibration.

Therefore, the method of balancing a rotor assembly preferably takes into consideration static unbalance force, correction mass forces and bending force distributions based on component geometric and mass data; thereby creating a complete geometric balancing process eliminating the need and cost of conventional physical balancing approaches.

Moreover, the additional focus on bending and correction forces provides an effective solution in balancing flexible rotors that tend to be very responsive to the presence of bending moments.

It will be understood that when correction masses are installed (actually or virtually, i.e. during analysis) at some earlier stage in the balancing process, the static forces and bending moments introduced by the correction masses are preferably factored in, along with the other components, in order to analytically determine the optimal stacking positions of the "corrected" rotor assembly. One skilled in the art will appreciate that the step of adding correction masses may be carried out in any suitable manner and at any suitable point in the above process, however not all correction mass approaches will yield identical results.

In summary, presented are a number of techniques which may be used individually or in conjunction with one another (and/or other techniques) to balance a rotor assembly. The above description is meant to be exemplary only, and one skilled in the art will recognize that changes may be made to the embodiments described without departing from the scope of the invention disclosed. For example, the method of balancing described above can be applied, with suitable modification, to an overhung rotor assembly (i.e. one in which the bearings are not located at both ends). Also, any suitable approach to providing initial predictions for geometric stacking of the rotor may be used, or may be omitted altogether, with the optimization beginning instead with any selected rotor assembly stacking arrangement. Still other modifications which fall within the scope of the present invention will be apparent to those skilled in the art, in light of a review of this disclosure, and such modifications are intended to fall within the appended claims.

What is claimed is:

1. A method of assembling a rotor assembly of a gas turbine engine, the rotor assembly including a plurality of rotor components mounted between axially spaced-apart bearings, the method comprising:
   for an initial assembly of the rotor components, determining initial geometric data indicative of a radial deviation of a centre of mass of each rotor component relative to an axis of rotation of the assembly defined by the axially spaced-apart bearings;
   determining an initial mass of each rotor component;
   using the initial geometric data and mass data to calculate unbalance forces at the axially spaced-apart bearings;
   calculating a bending moment distribution acting on the rotor assembly induced by the rotor components and representative of the forces reacted by the axially spaced-apart bearings;
   considering an entire rotor shape between the bearings, determining a set of rotor component stacking positions and associated bearing reactions which minimize cumulative bending moments in the rotor assembly;
   assembling the rotor assembly using said set of rotor component stacking positions; and
   correcting a residual unbalance present in the rotor assembly.

2. The method defined in claim 1, wherein the step of determining a set of rotor component stacking positions includes the step of iteratively calculating said bending moments for a range of possible component stacking positions, and selecting said set of rotor component stacking positions from said range.

3. The method defined in claim 2, wherein the step of iteratively calculating includes calculating said bending moments for a range of possible component stacking positions and possible rotor component mass corrections, and wherein the step of selecting said set of rotor component stacking positions includes selecting a set of rotor component mass corrections.

4. The method defined in claim 1, wherein the step of determining a set of rotor component stacking positions includes determining mass corrections to be applied to a plurality of rotor components.

5. The method defined in claim 1, wherein the step of assembling the rotor further comprises the step of adding correction masses to a plurality of rotor components prior to rotor assembly.

6. The method defined in claim 1, wherein the step of calculating the bending moment distribution includes the step of calculating respective sum of the internal moments of the rotor components.

7. The method defined in claim 1, wherein minimizing the bending moments includes determining moments having moment arms equal to a distance between the axial positions of the components relative to each point.

8. The method defined in claim 1, further comprising: using the mass and the location of the center of each rotor component to calculate a static unbalance force associated with each component, and wherein the step of optimizing also includes minimizing the static unbalance forces.

9. The method defined in claim 1, wherein the step of minimizing the bending moments comprises determining for each rotor component an optimum assembly stacking position and an optimum mass correction.

10. The method defined in claim 9, wherein the step of minimizing the bending moments further comprises minimizing a total static unbalance force on each bearing.

11. A method of assembling a rotor assembly of a gas turbine engine having a plurality of components mounted between axially spaced-apart bearings, the method comprising:
    determining bearing reaction loads and a bending moment induced by each component by using a mass and a center of mass location of each component;
    determining an assembly bending moment distribution for a plurality of combinations of component stacking positions and mass corrections, the assembly bending moment distribution being representative of the forces reacted at the axially spaced-apart bearings;
    determining a rotor arrangement which provides a lowest total bending moment for the assembly;
    defining the component stacking positions and mass corrections associated with the lowest assembly bending moment as optimal stacking arrangement;
    assembling the rotor assembly using said optimal stacking arrangement; and
    correcting a residual unbalance present in the rotor assembly.

12. The method defined in claim 11, wherein the assembling step comprises adding correction masses to the plurality of components prior to rotor assembly.

13. The method as defined in claim 11, further comprising calculating the static force unbalances of the rotor assembly acting on bearings provided at opposed ends of the rotor assembly, and wherein defining optimal stacking arrangement includes defining the component stacking positions and mass corrections associated with the lowest assembly bending moments and the lowest static unbalance forces.

14. A method of assembling a rotor assembly of a gas turbine engine having a set of rotor components mounted between axially spaced-apart bearings, the method comprising:

for each rotor component, determining a mass and a location of a center of mass with respect to an axis of rotation defined by the axially spaced-apart bearings;

using the mass and the location of the center of mass to determine a static unbalance force associated with each rotor component;

summing the static unbalance forces of the rotor components to provide a total static unbalance force of the rotor assembly representative of the forces reacted at the axially spaced-apart bearings;

providing an optimized rotor arrangement by optimizing at least one mass correction to be applied to the rotor components to thereby minimize the total static unbalance force of the rotor assembly;

assembling the rotor assembly in the optimized rotor arrangement, including applying said at least one optimized mass correction to the set of rotor components; and correcting a residual unbalance present in the rotor assembly.

15. The method defined in claim 14, wherein the step of assembling the rotor assembly further comprises the step of mounting at least one correction mass to at least one of the rotor components prior to assembly.

16. The method defined in claim 14, further comprising optimizing the at least one correction mass to thereby minimize the total static unbalance force at each bearing.

17. The method defined in claim 16, further comprising the step of determining a residual static unbalance force at the axially spaced-apart bearings associated with said optimized rotor arrangement, and providing correction masses to the rotor assembly to counter said residual static unbalance force.

* * * * *